United States Patent
Newman et al.

(10) Patent No.: US 10,700,395 B2
(45) Date of Patent: Jun. 30, 2020

(54) BATTERY MODULE HOUSING HAVING AN INTEGRALLY-FORMED COOLING PLATE

(71) Applicant: NIO USA, Inc., San Jose, CA (US)

(72) Inventors: Austin Newman, San Jose, CA (US); Joshua Smith, Los Gatos, CA (US)

(73) Assignee: NIO USA, Inc., San Jose, CA (US)

( * ) Notice: Subject to any disclaimer, the term of this patent is extended or adjusted under 35 U.S.C. 154(b) by 166 days.

(21) Appl. No.: 15/363,004

(22) Filed: Nov. 29, 2016

(65) Prior Publication Data

US 2018/0048039 A1 Feb. 15, 2018

Related U.S. Application Data

(60) Provisional application No. 62/372,765, filed on Aug. 9, 2016.

(51) Int. Cl.

| | |
|---|---|
| *H01M 10/6556* | (2014.01) |
| *H01M 10/613* | (2014.01) |
| *H01M 10/6554* | (2014.01) |
| *H01M 10/625* | (2014.01) |
| *H01M 10/615* | (2014.01) |
| H01M 10/653 | (2014.01) |
| H01M 2/10 | (2006.01) |

(52) U.S. Cl.
CPC ..... *H01M 10/6556* (2015.04); *H01M 10/613* (2015.04); *H01M 10/615* (2015.04); *H01M 10/625* (2015.04); *H01M 10/6554* (2015.04); *H01M 2/1077* (2013.01); *H01M 10/653* (2015.04); *H01M 2220/20* (2013.01)

(58) Field of Classification Search
CPC ........... H01M 10/6556; H01M 10/613; H01M 2220/20; H01M 10/625; H01M 10/6554; H01M 2/1077

USPC .......................................................... 429/72
See application file for complete search history.

(56) References Cited

U.S. PATENT DOCUMENTS

| | | |
|---|---|---|
| 8,456,807 B2 | 6/2013 | Tallam et al. |
| 8,597,843 B2 | 12/2013 | Yamamoto et al. |
| 9,160,038 B2 | 10/2015 | Buck et al. |
| | (Continued) | |

OTHER PUBLICATIONS

Official Action for U.S. Appl. No. 15/340,233, dated Apr. 16, 2018, 8 pages, Restriction Requirement.

(Continued)

*Primary Examiner* — Jonathan G Jelsma
*Assistant Examiner* — Omar M Kekia
(74) *Attorney, Agent, or Firm* — Sheridan Ross P.C.

(57) ABSTRACT

A battery module has a lower housing and an upper housing. The lower housing has a plurality of generally vertical sidewalls defining a space for receiving a plurality of battery cells and a generally horizontal bottom wall. The plurality of sidewalls include a first sidewall. The lower housing further has a cooling plate integrally formed with the lower housing. The cooling plate has a support wall extending generally parallel to the bottom wall for supporting the plurality of battery cells, a plurality of generally vertical channel walls including a first channel wall, and a cooling channel for receiving a coolant fluid therein. At least a portion of the cooling channel is defined at sides thereof by the first sidewall and the first channel wall. The upper housing covers a top opening of the lower housing to form an enclosure for the plurality of battery cells.

15 Claims, 4 Drawing Sheets

(56) References Cited

U.S. PATENT DOCUMENTS

| | | |
|---|---|---|
| 2007/0009787 A1 | 1/2007 | Straubel et al. |
| 2007/0037053 A1* | 2/2007 | Anantharaman ....... H01M 2/02 |
| | | 429/176 |
| 2010/0279159 A1 | 11/2010 | Meintschel et al. |
| 2011/0097614 A1 | 4/2011 | Kim |
| 2011/0165446 A1 | 7/2011 | Hermann |
| 2012/0125447 A1* | 5/2012 | Fuhr ................... H01M 2/0262 |
| | | 137/260 |
| 2013/0183555 A1* | 7/2013 | Boddakayala ...... H01M 2/1077 |
| | | 429/72 |
| 2013/0209858 A1 | 8/2013 | Schmitt et al. |
| 2013/0337310 A1 | 12/2013 | Omura et al. |
| 2013/0344362 A1* | 12/2013 | Raisch ...................... F28D 1/00 |
| | | 429/93 |
| 2015/0044538 A1 | 2/2015 | Katayama et al. |
| 2015/0093613 A1* | 4/2015 | Obasih ................ H01M 10/625 |
| | | 429/82 |
| 2015/0101352 A1* | 4/2015 | Kwak .................. H05K 7/2039 |
| | | 62/3.1 |
| 2015/0140388 A1* | 5/2015 | Harada ............... H01M 10/617 |
| | | 429/120 |
| 2015/0180098 A1 | 6/2015 | Eckl et al. |
| 2015/0311485 A1* | 10/2015 | Fister ................... H01M 2/1077 |
| | | 429/151 |
| 2016/0028059 A1 | 1/2016 | Sweney et al. |
| 2016/0301117 A1 | 10/2016 | Tyler et al. |
| 2017/0005383 A1 | 1/2017 | Harris |
| 2017/0200995 A1 | 7/2017 | Phlegm et al. |
| 2018/0034122 A1 | 2/2018 | Newman |
| 2018/0048037 A1 | 2/2018 | Newman |
| 2018/0090736 A1 | 3/2018 | Cho et al. |
| 2018/0219199 A1 | 8/2018 | Lee et al. |
| 2018/0301771 A1 | 10/2018 | Jennrich et al. |

OTHER PUBLICATIONS

U.S. Appl. No. 15/455,239, filed Mar. 10, 2017, Newman.
U.S. Appl. No. 15/581,216, filed Apr. 28, 2017, Newman et al.
De Jong et al., "Low-Stress Interconnections of Solar Cells," Energy Research Centre of the Netherlands, Mar. 28, 2018, retrieved from https://www.ecn.nl/fileadmin/ecn/units/zon/docs/5CO2_2_Jong_P.C._de.pdf, 15 pages.
Official Action for U.S. Appl. No. 15/455,239, dated Sep. 28, 2018 20 pages.
Final Action for U.S. Appl. No. 15/455,239, dated Apr. 5, 2019 24 pages.
Official Action for U.S. Appl. No. 15/581,216, dated Jan. 15, 2019 8 pages, Restriction Requirement.
Official Action for U.S. Appl. No. 15/581,216, dated Apr. 11, 2019 9 pages.
Official Action for U.S. Appl. No. 15/455,239, dated Aug. 29, 2019 26 pages.
Final Action for U.S. Appl. No. 15/581,216, dated Oct. 24, 2019 8 pages.

\* cited by examiner

BATTERY MODULE HOUSING HAVING AN INTEGRALLY-FORMED COOLING PLATE

PRIORITY CLAIM

This application claims priority under 35 U.S.C. § 119 to U.S. Provisional Application No. 62/372,765, filed on Aug. 9, 2016 which is expressly incorporated by reference herein in its entirety.

FIELD OF INVENTION

The present disclosure relates to a battery module, such as a battery module for an electric vehicle, and, more particularly, to a battery module having an integrally-formed cooling plate structure.

BACKGROUND

Many electric vehicles rely on battery cells bundled into one or more battery modules to power the vehicle. It is known that the battery cells each build up temperature inside their battery case during use. In order to dissipate this heat, the battery modules include a cooling plate which acts as a heat transfer device to absorb the heat into a coolant fluid. Similarly, cooling plates or similar devices may be used to provide a heating fluid which heats a battery cell (e.g., in low temperature environments). Many different configurations of cooling and/or heating plates are known.

Most cooling plates used in combination with electric vehicle battery modules are separate devices which are positioned in contact with an outer module wall of a module housing. Due to this separation by a module wall, the cooling plate is made using a thermally-conductive material such as aluminum in order to more efficiently absorb the heat from the battery cells. However, this configuration is complex and requires manufacturing of a separate part, as well as design configurations for installation of the separate cooling plate. Moreover, because the cooling plate is thermally conductive, it should be isolated from other components of the vehicle. This may be accomplished through placement of the cooling plate on an isolating pad, which adds an additional component and expense.

The disclosed embodiments are directed to overcoming these and other problems of the prior art.

SUMMARY

In one aspect, the present disclosure is directed to a battery module. The battery module includes a lower housing and an upper housing. The lower housing includes a plurality of generally vertical sidewalls defining a space for receiving a plurality of battery cells and a generally horizontal bottom wall. The plurality of sidewalls include a first sidewall. The lower housing further includes a cooling plate integrally formed with the lower housing. The cooling plate includes a support wall extending generally parallel to the bottom wall for supporting the plurality of battery cells, a plurality of generally vertical channel walls including a first channel wall, and a cooling channel for receiving a coolant fluid therein. At least a portion of the cooling channel is defined at sides thereof by the first sidewall and the first channel wall. The upper housing covers a top opening of the lower housing to form an enclosure for the plurality of battery cells.

In another aspect, the present disclosure is directed to a battery pack for an electric vehicle. The battery pack includes at least one battery module. Each battery module includes a plurality of battery cells configured to store electrical energy for use by the electric vehicle, and a battery module housing. The battery module housing includes a lower housing defining a space for the plurality of battery cells and including a bottom wall, an upper housing covering the plurality of battery cells in the space, and a cooling plate integrally formed with the lower housing supporting the plurality of battery cells.

In yet another aspect, the present disclosure is directed to a method of manufacturing a battery module housing. The method includes injection molding a lower housing from a material such that the lower housing includes a plurality of generally vertical sidewalls defining a space for receiving a plurality of battery cells, a generally horizontal bottom wall, a support wall extending generally parallel to the bottom wall and configured to support the plurality of battery cells, and a plurality of generally vertical channel walls extending from the bottom wall to the support wall. A cooling channel for receiving a coolant fluid therein is defined at sides thereof by the sidewalls and the channel walls and defined at a top and bottom thereof by the support wall and the bottom wall, respectively. The material which is injection molded to form the lower housing has a thermal conductivity coefficient of less than 1 W/mK.

BRIEF DESCRIPTION OF THE DRAWING(S)

The foregoing Summary and the following detailed description will be better understood when read in conjunction with the appended drawings, which illustrate a preferred embodiment of the invention. In the drawings.

DETAILED DESCRIPTION OF THE PREFERRED EMBODIMENT(S)

The present disclosure relates to a battery module for an electric vehicle battery pack. The battery module includes a battery module housing which has an integrally-formed cooling plate. The integrally-formed cooling plate is, for example, molded into a lower housing portion of the battery module housing. The cooling plate includes a cooling channel which is defined in part by the walls of the battery module housing. In this way, the battery module and battery pack can be formed lighter and through more cost efficient methods in comparison to battery modules which utilize a separate cooling plate. In addition, because the battery module housing has a relatively low thermal conductivity, the battery modules can be exposed to the environment and/or placed directly on a module support wall of the battery pack, as opposed to being placed on a thermal isolation pad.

Figure 1:
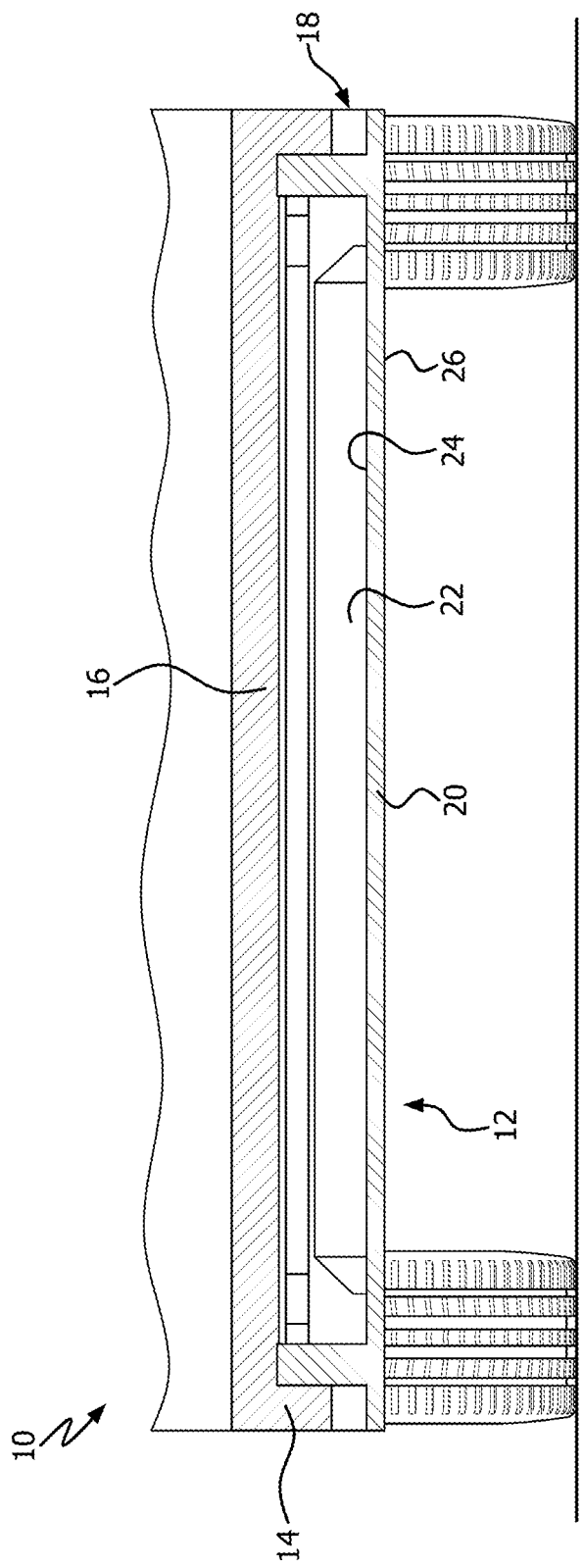
FIG. 1 is a cross-sectional view of a lower portion of a vehicle, including an exemplary battery pack.

FIG. 1 illustrates a lower portion of an exemplary electric vehicle 10. The electric vehicle 10 preferably includes a battery pack 12 which supplies electrical power to an electric motor (not shown). The electric vehicle 10 includes a vehicle body 14 including a floor panel 16. The floor panel 16 is a lower body panel of the vehicle body 14, separating an interior cabin portion of the electric vehicle 10 from an exterior of the vehicle. In an exemplary embodiment, the battery pack 12 is positioned beneath the floor panel 16.

The battery pack 12 is a system of electrical energy storage components which store, provide, and receive electrical energy for use by the various systems of the electric vehicle 10. The battery pack 12 may include a supporting structure 18 which is at least partially beneath the floor panel 16. The supporting structure 18 is connected to the vehicle body 14 and provides a means by which the battery pack 12 is supported from the vehicle. The supporting structure may be above and/or below the battery pack 12. In some embodiments, the supporting structure 18 includes module support surface 20 for the battery pack 12. In some embodiments, the battery pack 12 includes a plurality of battery modules 22 which are supported by the supporting structure 18 (e.g., suspended by support members or placed on the module support wall 20).

The supporting structure 18 is a structural component of the electric vehicle 10, constructed to be an exterior shell for the battery pack 12. In some embodiments, the supporting structure 18 includes only suspending or connecting elements which are configured suspend the battery module(s) 22 below the floor panel 16 of the vehicle 10. In an exemplary embodiment, the module support wall 20 is a generally-horizontally extending panel or group of panels which includes a module support surface 24 and an exterior surface 26. The module support surface 24 and exterior surface 26 are opposite surfaces of the module support wall 20. The module support wall 20 is preferably formed from a material acceptable for forming the exterior surface 26, such as metal, fiberglass, or other strong, rigid material.

In an exemplary embodiment, the vehicle body 14 and the support structure 18 define a receiving space 28. The receiving space may be below the floor panel 16. For example, the receiving space may be between the floor panel 16 and the module support wall 20 (in embodiments which include the module support wall 20). The battery modules 22 may be placed directly on the module support surface 24. However, it should be understood that the illustrated embodiment is exemplary and that other battery pack configurations are possible. In particular, configurations in which the battery pack 12 includes a different support structure for supporting and/or retaining the battery modules 22 at another location on the electric vehicle 10.

Figure 2:
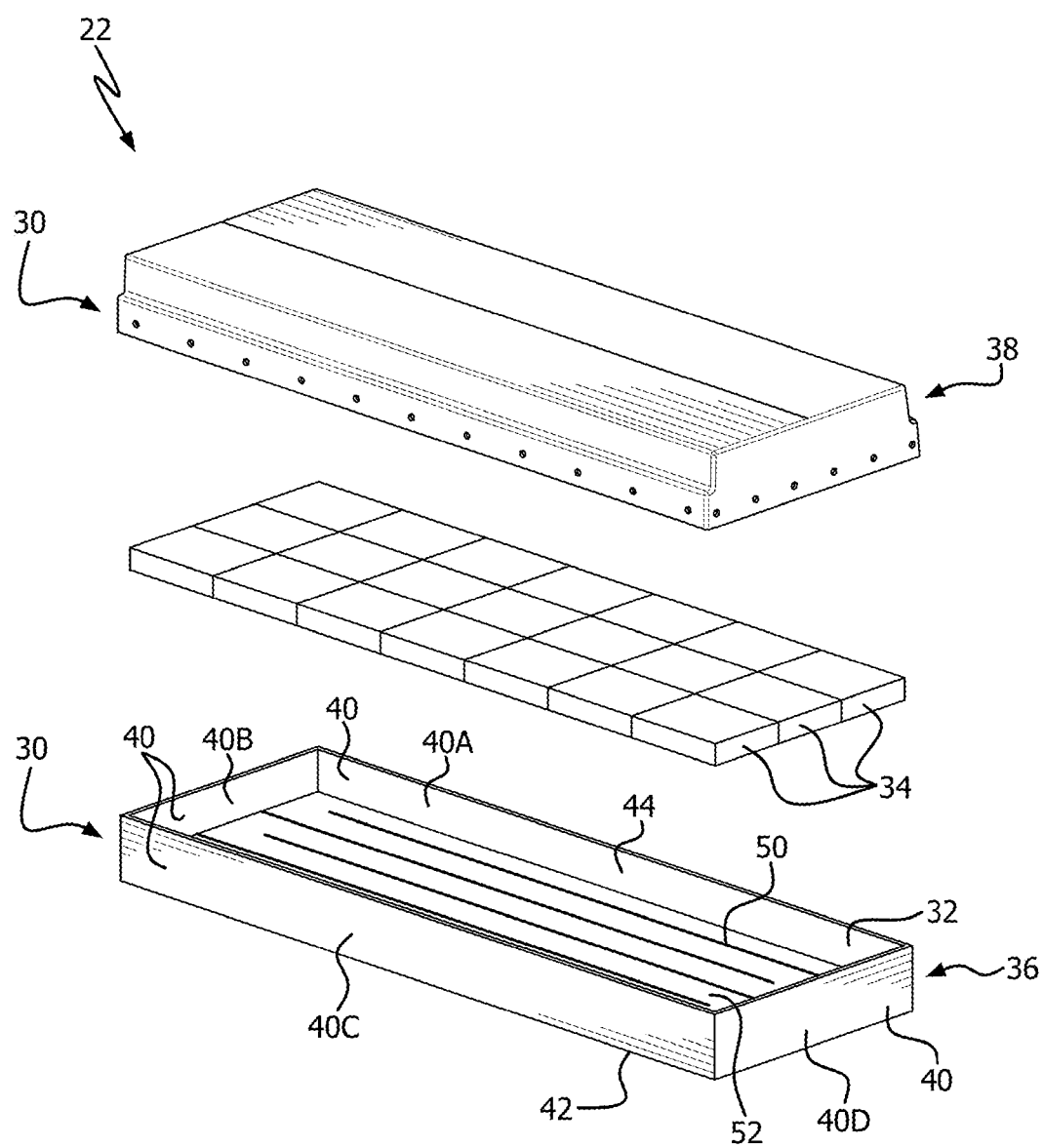
FIG. 2 is an exploded view illustrating an exemplary battery module.

FIG. 2 is an exploded view of one of the battery modules 22, consistent with disclosed embodiments. In an exemplary embodiment, each battery module 22 includes a module housing 30 which creates an enclosure for the components of each battery module 22. For example, the module housing 30 defines a space 32 for receiving a plurality of battery cells 34.

In an exemplary embodiment, the module housing 30 includes a lower housing 36 and an upper housing 38. It should be understood that the terms "lower" and "upper" are used as examples only and that, in other embodiments, the features of the lower housing 36 may apply to an upper housing and the features of the upper housing 38 may apply to a lower housing.

The lower housing 36 preferably defines the space 32 for receiving the plurality of battery cells 34. For example, the lower housing 36 may include a plurality of generally vertical sidewalls 40. The plurality of sidewalls 40 include at least a first sidewall 40A. In the exemplary disclosed embodiment in which the battery module 22 is rectangular, the lower housing 36 further includes a second sidewall 40B, a third sidewall 40C, and a fourth sidewall 40D. It should be understood, however, that the shape of the battery module 22 is not limited to any particular shape and in general includes at least one sidewall (e.g., first sidewall 40A) which in part defines the space 32 for receiving the plurality of battery cells 34. In addition, the lower housing 36 includes a bottom wall 42 which forms a lower boundary of the battery module 22. The bottom wall 42 is generally horizontal.

The sidewalls 40 are directly connected at their ends to the bottom wall 42. The sidewalls 40 extend generally perpendicular away from the bottom wall 42 to define the space 32. The sidewalls 40 define a top opening 44 into the space 32. In other words, a height of the sidewalls 40 is measured from the bottom wall 42 to the top opening 44. The battery cells 34 may be inserted through the top opening 44 and positioned in the space 32.

The upper housing 38 covers the top opening 44 of the lower housing 36 to form an enclosure for the plurality of battery cells 34. For example, the upper housing 38 includes at least a top panel 46 which forms a lid for enclosing the space 32. It should be understood that the upper housing 38 may be a separate, connected, or integral component of the module housing 30 with respect to the lower housing 36. For example, the upper housing 38 may be a separate component which overlaps the sidewalls 40 and is fastened thereto to form an enclosed battery module 22.

Each battery cell 34 may be an electrical storage device configured to store electrical energy for use by the electric motor of the electric vehicle 10. Each battery cell 34 may be, for example, a replaceable battery, rechargeable battery, or the like. Each battery cell 34 may include an associated battery case. The battery cells 34 may take any of a number of configurations, including being cylindrical battery cells, rectangular battery cells, etc. In an exemplary embodiment, the battery cells 34 are rechargeable lithium-ion batteries, but are not limited thereto. The battery cells 34 may be connected in series to provide a combined electrical output as the battery module 22. Each battery module 22 may be connected in series to provide combined electrical output as the battery pack 12. It should be understood that other configurations and connections are possible. The battery pack modules 22 and battery pack 12 may include additional components, including busbars, wiring, physical connectors, etc. which allow battery modules 22 and battery pack 12 to be operational in conjunction with electric vehicle 10.

The battery cells 34 are positioned in the space 32 defined by the lower housing 36. As is known in the art, the battery cells 34 generate heat during operation. In order to dissipate this heat generation, each battery module 22 includes a cooling plate 48 configured to absorb heat from the battery cells 34 in order to manage the heat generation associated with the battery cells 34. The cooling plate 48, for example, includes at least one cooling channel 50 configured to receive a coolant fluid.

Further, it should be understood that the terms "cooling plate," "cooling channel," and "coolant fluid," are not limited to devices which only cool the battery pack 12 and also apply to embodiments in which the battery pack 12 is heated. For example, in some embodiments, components of the battery pack 12 (e.g., the battery cells 34) may absorb heat from a fluid (e.g., a fluid which is above the temperature of the battery cells 34). In this way, the cooling plate 48 and associated components may be configured to heat the battery cells 34, such as when the battery pack 12 is present in a low-temperature environment.

Consistent with disclosed embodiments, the cooling plate 48 is integrally formed with the lower housing 36. For example, the cooling plate 48 forms a lower portion of the lower housing 36, beneath the space 32 which receives the plurality of battery cells 34. The cooling plate 48 includes a support wall 52 which extends generally parallel to the bottom wall 42 (e.g., generally horizontally). The support wall 52 supports the plurality of battery cells 34, which are positioned in contact with the support wall 52.

Figure 3:
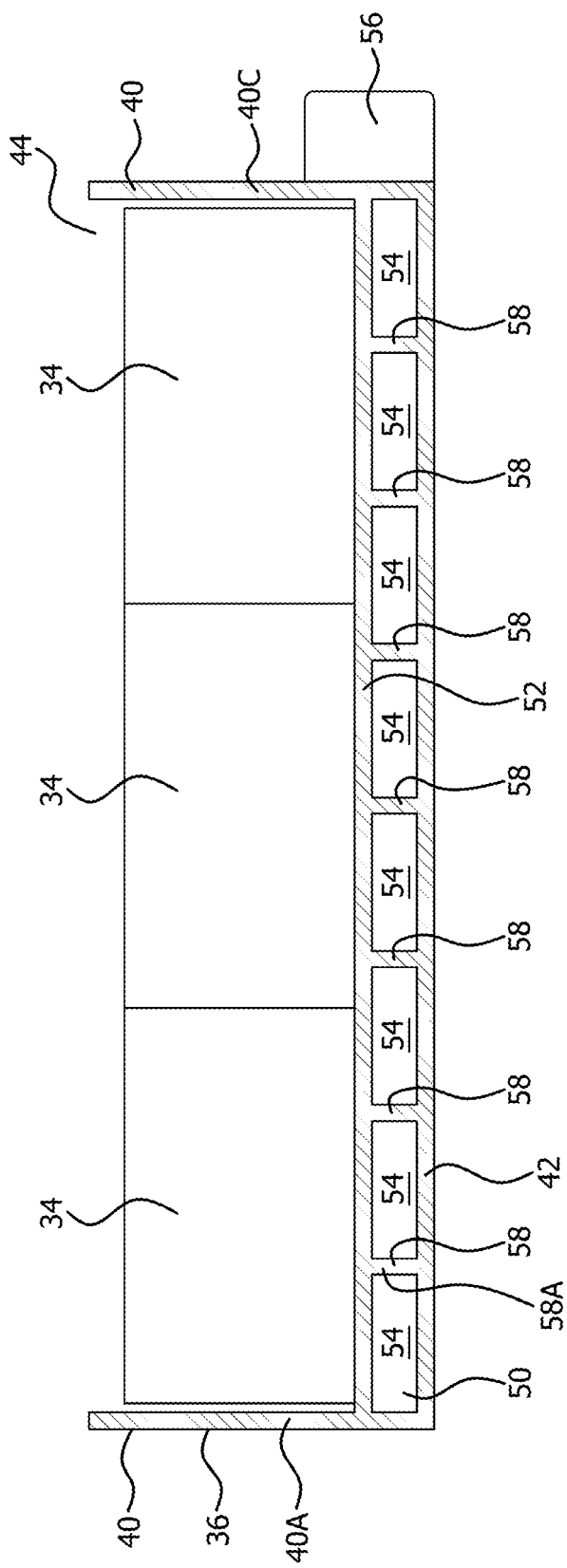
FIG. 3 is a cross-sectional side view of the exemplary battery module.

FIG. 3 illustrates a cross-sectional view of the lower housing 36 with the plurality of battery cells 34 placed therein (e.g., in the space 32 defined by the plurality of sidewalls 40). The sidewalls 40, including the first sidewall 40A, are directly connected at ends thereof to the bottom wall 42 and extend away therefrom (i.e., to the top opening 44). In an exemplary embodiment, the bottom wall 42 of the battery module 22 forms the bottom surface of the battery pack 12. That is, the battery module 22 is installed on the vehicle 10 such that the battery components are supported from above and the bottom wall 42 is the lowermost surface.

In other embodiments, the bottom wall 42 is placed directly on the module support surface 24 of the module support wall 20 (as shown in FIG. 1). In other words, the bottom wall 42 (i.e., a bottom surface thereof) is in contact with the module support wall 20.

The integrally-formed cooling plate 48 forms a lower portion of the lower housing 36 and defines the at least one channel 50. As shown in FIG. 3, the at least one channel 50 may include a plurality of channel sections 54. The channel sections 54 may be interconnected such that the channel 50 is one long channel or the channel sections 54 may be separate such that the at least one channel 50 includes a plurality of short channels. A fluid source 56 is connected to the at least one channel 50 such that coolant fluid can be fed into the channel(s) 50 for circulation throughout the lower housing 36.

The cooling plate 48 preferably includes the support wall 52 which is directly connected to the plurality of sidewalls 40 at ends thereof. In this way, the support wall 52 completely separates the space 32 from the channel 50. In an exemplary embodiment, the cooling plate 48 further includes a plurality of channel walls 58 which define sides of the channel sections 54. The channel walls 58 are generally vertical and generally parallel to the sidewalls 40. The channel walls 58 are directly connected to and extend away from the bottom wall 42 to the support wall 52. In this way, the height of the channel walls 58 is less than the height of the sidewalls 40.

The cooling plate 48, being integrally formed with the lower housing 36 provides a simplified structure in which the cooling path (i.e., cooling channel 50) is sealed in part by the sidewalls 40 and bottom wall 42 of the lower housing 36. In this way, use of a separate cooling plate, which would require additional walls on all sides to seal the cooling path, is avoided.

Due to the disclosed configuration, the first sidewall 40A and the bottom wall 42 define at least a portion of the cooling channel 50. For example, at least a portion of the cooling channel 50 (e.g., an end one of the channel sections 54) is defined at sides thereof by the first sidewall 40A and a first channel wall 58A and defined at a top and bottom thereof by the support wall 52 and the bottom wall 42, respectively. Moreover, the second sidewall 40B, the third sidewall 40C, and the fourth sidewall 40D each define at least a portion of at least one of the channel sections 54. In this way, the sidewalls 40 and the bottom wall 42 are used as structural components which form part of both the enclosure for the battery cells 34 and the channel 50 for receiving coolant fluid for cooling the battery cells 34.

Figure 4:
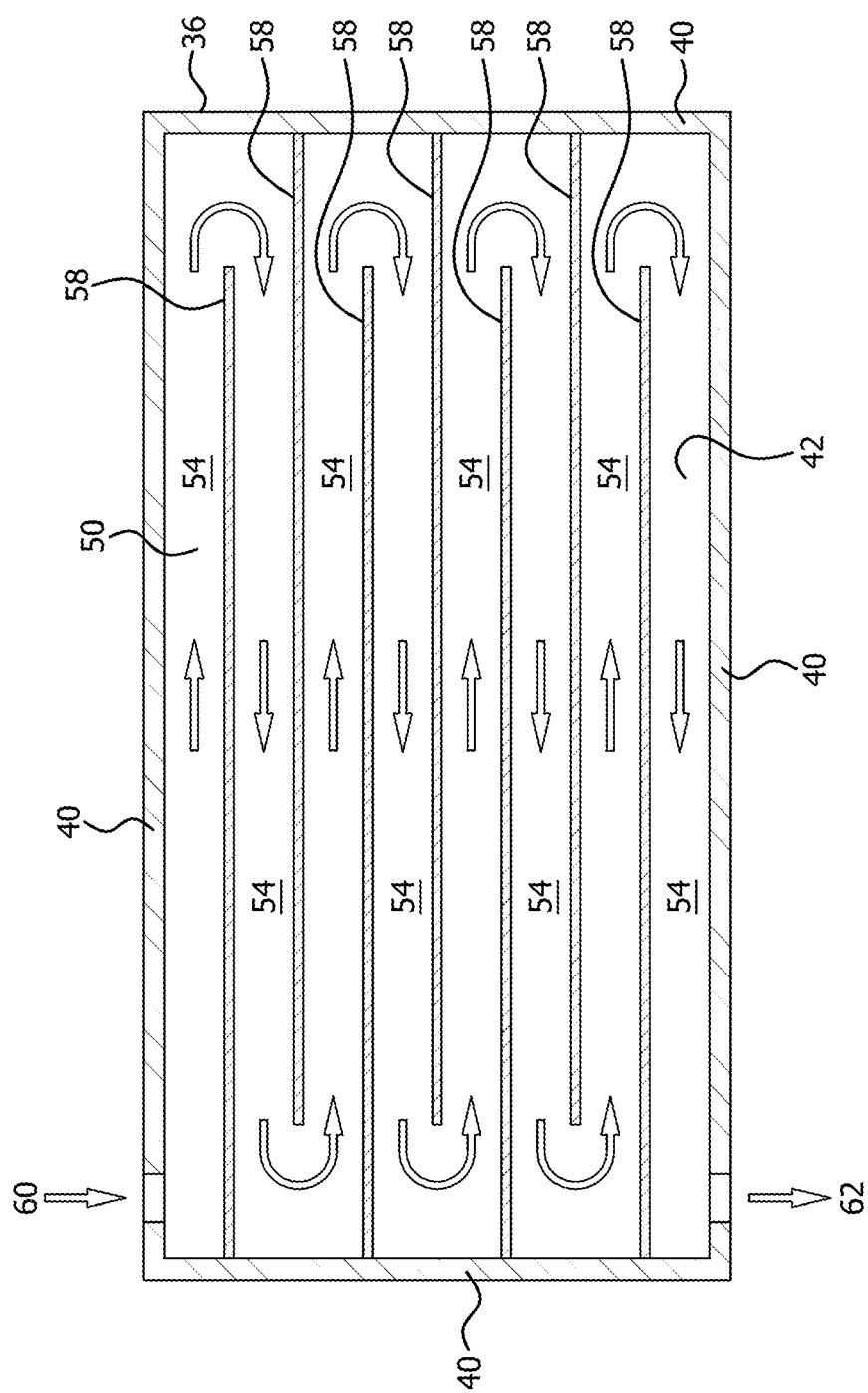
FIG. 4 is a top view of an exemplary lower housing of the battery module.

The disclosed module housing 30 includes the integrally-formed cooling plate 48. In use, the cooling channel 50 receives coolant fluid from the fluid source 56 and circulates the coolant fluid throughout the lower housing 36, between and in contact with the support wall 52 and the bottom wall 42. FIG. 4 illustrates an exemplary configuration of the support walls 58, which form parallel channel sections 54 of the cooling channel 50. Coolant fluid flows through an inlet 60, into a first portion of the channel 50, flows through the plurality of channel sections 54 as shown, and exits through an outlet 62.

It should be understood that the illustrated channel 50 and channel sections 54 is exemplary and that other configurations are possible. For example, instead of straight, parallel cooling paths, a spiral pattern may be used. The integral configuration of the cooling plate 48, which utilizes the sidewalls 40 and bottom wall 42 to seal the cooling path, allows for greater flexibility in cooling path design as compared to separate cooling plates.

In an exemplary embodiment, the lower housing 36 and the cooling plate 48 are formed from the same material. In order to help prevent thermal conductivity through the sidewalls 40, the selected material is preferably a material with a low thermal conductivity coefficient, such as a plastic material. This further allows the bottom wall 42 to be placed such that it is exposed to the environment or in contact with the module support wall 20, because it is undesirable for heat transfer to occur to such an exterior component. Because the cooling plate 48 is integrally formed with the sidewalls 40, the close proximity still allows for sufficient heat dissipation from the plurality of battery cells 34. The lower housing 36 with integrally-formed cooling plate 48 may be formed through an injection molding process, for example.

In order to balance the need for some thermal conductivity, the material from which the lower housing 36 and cooling plate 48 is formed may be a thermally-conductive plastic having a thermal conductivity coefficient of less than 20 W/mK. In other embodiments, the material may be a low thermal-conductivity material, such as a typical plastic used to form a module housing (e.g., HPDE). For example, the lower housing 36 and cooling plate 48 may be formed from a material having a thermal conductivity coefficient of less than 1 W/mK. In alternative embodiments, portions of the lower housing 36 may be formed from different materials. For example, the bottom wall 42 and the support wall 52 may be formed from different materials, with the material of the bottom wall 42 including a thermal conductivity coefficient which is less than the material of the support wall 52. For example, the support wall 52 may be formed from a thermally-conductive plastic and the bottom wall 42 may be formed from a low thermal-conductivity material.

The disclosed embodiments provide a housing for a battery module which includes an integrally formed cooling plate. This removes the need for a separate cooling plate, thereby reducing the size, weight, and cost of a battery pack. Moreover, the one-piece structure allows the use of a single material with low thermal conductivity while still providing sufficient heat dissipation. The low thermal conductivity of the selected material additionally allows the bottom wall of the cooling plate to be the bottom surface of the battery pack system or, alternatively, for direct placement of the battery module on a supporting structure of a battery pack, further reducing the need for additional components such as a thermal isolation pad.

Having thus described the presently preferred embodiments in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiments and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. A battery module housing, comprising:
    a lower housing formed from a plastic material, comprising:
        a plurality of generally vertical sidewalls surrounding a plate area and defining a space for receiving a plurality of battery cells; and
        a generally horizontal bottom wall;
    a cooling plate integrally formed from the plastic material in a portion of the lower housing, the cooling plate comprising:
        a support wall extending generally parallel to the bottom wall and configured to contact and support each of the plurality of battery cells;
        a plurality of generally vertical channel walls extending between the bottom wall and the support wall in the plate area, the plurality of channel walls offset from one another by a channel distance, the plurality of channel walls including a first set of channel walls attached to a first sidewall of the lower housing and offset from an opposite second sidewall of the lower housing, the plurality of channel walls including a second set of channel walls attached to the second sidewall and offset from the first sidewall, wherein each of the second set of channel walls are disposed between adjacent channel walls in the first set of channel walls;
        a continuous cooling channel for receiving a coolant fluid therein, at least a portion of the continuous cooling channel being defined at sides thereof by the first set of channel walls and the second set of channel walls, the continuous cooling channel defining a cooling path in the plate area that changes flow direction at each point where a channel wall of the plurality of channel walls is offset from a sidewall of the plurality of sidewalls, wherein the continuous cooling channel spans each of the plurality of battery cells;
    a single inlet disposed in a third sidewall of the generally vertical sidewalls, the third sidewall in contact with the first and second sidewalls, wherein the single inlet is in fluid communication with the continuous cooling channel on an inlet side of the lower housing; and
    a single outlet disposed in a fourth sidewall of the generally vertical sidewalls, the fourth sidewall in contact with the first and second sidewalls, wherein the fourth sidewall is disposed on an opposite outlet side of the lower housing from the inlet side, wherein the single outlet is in fluid communication with the continuous cooling channel on the outlet side of the lower housing, and wherein the cooling path defines a coolant flow direction from the single inlet to the single outlet via the continuous cooling channel; and
    an upper housing configured to cover a top opening of the lower housing to form an enclosure for the plurality of battery cells,
    wherein the first, second, third, and fourth sidewalls are a same height that is greater than a height of the plurality of channel walls and a height of the plurality of battery cells,
    wherein the single inlet and the single outlet are aligned with one another in a direction in which the first and second sidewalls extend,
    wherein the first and second sidewalls are shorter in length than the third and fourth sidewalls, and
    wherein the upper housing is configured to be fixed to the first, second, third, and fourth sidewalls.

2. The battery module housing of claim 1, wherein the first sidewall and each of the plurality of channel walls are directly connected to the bottom wall.

3. The battery module housing of claim 1, wherein the first sidewall extends from the bottom wall to the top opening and the plurality of channel walls extend from the bottom wall to the support wall.

4. The battery module housing of claim 1, wherein the lower housing and the cooling plate are formed from a same material.

5. The battery module housing of claim 4, wherein the material includes a thermal conductivity coefficient of less than 20 W/mK.

6. The battery module housing of claim 5, wherein the material includes a thermal conductivity coefficient of less than 1 W/mK.

7. The battery module housing of claim 1, wherein the bottom wall and the support wall are formed from different materials, with a material of the bottom wall includes a thermal conductivity coefficient which is less than a material of the support wall.

8. A battery pack for an electric vehicle, comprising:
    at least one battery module comprising:
        a plurality of battery cells configured to store electrical energy for use by the electric vehicle; and
        a battery module housing comprising:
            a lower housing formed from a plastic material and defining a space for the plurality of battery cells and including a bottom wall;
            an upper housing covering the plurality of battery cells in the space; and
            a cooling plate integrally formed from the plastic material in a portion of the lower housing and supporting the plurality of battery cells, the cooling plate comprising:
                a support wall extending generally parallel to the bottom wall and configured to contact and support each of the plurality of battery cells;
                a plurality of generally vertical channel walls extending between the bottom wall and the support wall, the plurality of channel walls offset from one another by a channel distance, the plurality of channel walls including a first set of channel walls attached to a first sidewall of the lower housing and offset from an opposite second sidewall of the lower housing, the plurality of channel walls including a second set of channel walls attached to the second sidewall and offset from the first sidewall, wherein each of the second set of channel walls are disposed between adjacent channel walls in the first set of channel walls;

a continuous cooling channel for receiving a coolant fluid therein, at least a portion of the continuous cooling channel being defined at sides thereof by the first set of channel walls and the second set of channel walls, the continuous cooling channel defining a cooling path that changes flow direction at each point where a channel wall of the plurality of channel walls is offset from a sidewall of the lower housing, wherein the continuous cooling channel spans each of the plurality of battery cells;

a single inlet disposed in a third sidewall of the generally vertical sidewalls, the third sidewall in contact with the first and second sidewalls, wherein the single inlet is in fluid communication with the continuous cooling channel on an inlet side of the lower housing; and a single outlet disposed in a fourth sidewall of the generally vertical sidewalls, the fourth sidewall in contact with the first and second sidewalls, wherein the fourth sidewall is disposed on an opposite side of the lower housing from the inlet side, wherein the single outlet is in fluid communication with the continuous cooling channel on the outlet side of the lower housing, and wherein the cooling path defines a coolant flow direction from the single inlet to the single outlet via the continuous cooling channel, wherein the first, second, third, and fourth sidewalls are a same height that is greater than a height of the plurality of channel walls and a height of the plurality of battery cells, wherein the single inlet and the single outlet are aligned with one another in a direction in which the first and second sidewalls extend, wherein the first and second sidewalls are shorter in length than the third and fourth sidewalls, and wherein the upper housing is configured to be fixed to the first, second, third, and fourth sidewalls.

9. The battery pack of claim 8, wherein the plurality of battery cells are arranged directly on the support wall.

10. The battery pack of claim 8, wherein the first, second, third, and fourth sidewalls extend from the bottom wall to a top opening, the support wall being directly connected to the first, second, third, and fourth, sidewalls at the ends thereof.

11. The battery pack of claim 10, wherein the bottom wall, the support wall, the plurality of channel walls, and the plurality of sidewalls are formed from a same material.

12. The battery pack of claim 11, wherein the material includes a thermal conductivity of less than 20 W/mK.

13. The battery pack of claim 12, wherein the material includes a thermal conductivity coefficient of less than 1 W/mK.

14. The battery pack of claim 8, further comprising a supporting structure including a module support wall that extends between axles of the electric vehicle, wherein the at least one battery module is positioned on the module support wall with the bottom wall in contact with the module support wall.

15. A method of manufacturing a battery module housing, comprising:

injection molding a lower housing from a plastic material such that the lower housing includes:
a plurality of generally vertical sidewalls defining a space for receiving a plurality of battery cells;
a generally horizontal bottom wall;
a support wall extending generally parallel to the bottom wall and configured to contact and support each of the plurality of battery cells;
a plurality of generally vertical channel walls extending from the bottom wall to the support wall, the plurality of channel walls offset from one another by a channel distance, the plurality of channel walls including a first set of channel walls attached to a first sidewall of the lower housing and offset from an opposite second sidewall of the lower housing, the plurality of channel walls including a second set of channel walls attached to the second sidewall and offset from the first sidewall, wherein each of the second set of channel walls are disposed between adjacent channel walls in the first set of channel walls;
a single inlet disposed in a third sidewall of the generally vertical sidewalls, the third sidewall in contact with the first and second sidewalls; and
a single outlet disposed in a fourth sidewall of the generally vertical sidewalls, the fourth sidewall in contact with the first and second sidewalls, wherein the fourth sidewall is disposed on an opposite outlet side of the lower housing from the inlet side, wherein a continuous cooling channel for receiving a coolant fluid therein is defined at sides thereof by the first set of channel walls and the second set of channel walls and defined at a top and bottom thereof by the support wall and the bottom wall, respectively, the continuous cooling channel defining a cooling path that changes flow direction at each point where a channel wall of the plurality of channel walls is offset from a sidewall of the plurality of sidewalls, wherein the continuous cooling channel spans each of the plurality of battery cells, wherein the single inlet is in fluid communication with the continuous cooling channel on an inlet side of the lower housing, wherein the single outlet is in fluid communication with the continuous cooling channel on the outlet side of the lower housing, wherein the cooling path defines a coolant flow direction from the single inlet to the single outlet via the continuous cooling channel, wherein the first, second, third, and fourth sidewalls are a same height that is greater than a height of the plurality of channel walls and a height of the plurality of battery cells, wherein the single inlet and the single outlet are aligned with one another in a direction in which the first and second sidewalls extend, wherein the first and second sidewalls are shorter in length than the third and fourth sidewalls, and wherein the upper housing is configured to be fixed to the first, second, third, and fourth sidewalls.

* * * * *